UNITED STATES PATENT OFFICE.

WILLIAM HENRY CLAUS, ALFRED RÉE, AND LEON MARCHLEWSKI, OF MANCHESTER, ENGLAND.

PROCESS OF MAKING COMPOUNDS OF PARAPHENETIDIN.

SPECIFICATION forming part of Letters Patent No. 647,075, dated April 10, 1900.

Application filed October 19, 1897. Serial No. 655,733. (Specimens.)

*To all whom it may concern:*

Be it known that we, WILLIAM HENRY CLAUS and ALFRED RÉE, subjects of the Queen of Great Britain, and LEON MARCHLEWSKI, a Pole, all domiciled in Great Britain, and now residing at Manchester, in the county of Lancaster, England, have invented new and useful Improvements in the Production of Condensation Products of Paraphenetidin, (for which we have applied for patents in Great Britain, No. 20,333, dated September 4, 1897, and in Germany, dated September 24, 1897, No. 97,736,) of which the following is a specification.

This invention relates to a process of making a new condensation product of a carbohydrate with paraphenetidin. The carbohydrate employed is one which, according to the views of some chemists, contains an aldehyde or ketone group or, according to other chemists, a group capable of being transformed under suitable conditions into an aldehyde or ketone group—that is to say, a carbohydrate is employed which contains or is capable of having produced therein an aldehyde or ketone group.

In carrying out our invention we may, by way of example, proceed as follows: Glucose, eighteen kilos, paraphenetidin, fourteen kilos, and alcohol about three hundred and twenty liters are heated at about 80° to 100° centigrade in a suitable open or closed vessel. After this treatment the greater part of the alcohol is distilled off, and the residue is then treated with ether or other suitable solvent for the purpose of extracting thereby any free phenetidin. A comparatively-small quantity of ether will suffice for this purpose. The ethereal solution having been removed, the residue is further treated with cold water to remove any free glucose. The ultimate residue is our new condensation product in one form, which we call "gluco-paraphenetidin" and which may be dried at a low temperature and be crystallized from boiling alcohol. It is a white beautifully-crystalline substance soluble with difficulty in cold water and more easily soluble in hot water and in hot alcohol. If it is boiled with dilute hydrochloric acid, it is split up into the carbohydrate and paraphenetidin. Its aqueous solution produces a brownish-violet coloration with ferric chlorid and reduces silver salts.

It is to be understood that relatively larger or smaller proportions of the carbohydrate or of the paraphenetidin may be used, especially when the separation of such of these substances as may not have entered into combination is properly effected by solvents, such as ether and water, as hereinbefore described.

The new product is tasteless, can be crystallized from its alcoholic solution in an unchanged condition, has a different melting-point from its only solid source, (glucose,) and has the chemical formula $C_{14}H_{21}NO_6$. It is therefore a definite chemical compound.

When a commercial and not a pure product is required to be produced, the treatment with ether or other solvent and with water for the separation of the uncombined constituents may be omitted, as well also as the crystallization from boiling alcohol. We in all cases, however, prefer to carry out our process in the wet way first described, the constituents being heated in alcohol and thereafter treated as set forth.

Having now particularly described and ascertained the nature of our said invention and in what manner the same is to be performed, we declare that what we claim is—

1. The process for the production of a condensation product of phenetidin, which consists in heating a solution of paraphenetidin and glucose in a solvent, in thereafter separating the solvent therefrom, and finally dissolving out the uncombined constituents with solvents, that is ether for the phenetidin and water for the glucose, and drying the resulting product.

2. The process for the production of a condensation product of phenetidin, which consists in heating a solution of paraphenetidin and glucose in a solvent, substantially as set forth.

WILLIAM HENRY CLAUS.
ALFRED RÉE.
LEON MARCHLEWSKI.

Witnesses:
WILLIAM E. HEYS,
ARTHUR MILLWARD.